Aug. 26, 1941.  E. S. CORNELL  2,253,846
MACHINE TOOL AND DUST GUARD THEREFOR
Filed Feb. 23, 1939  2 Sheets-Sheet 1
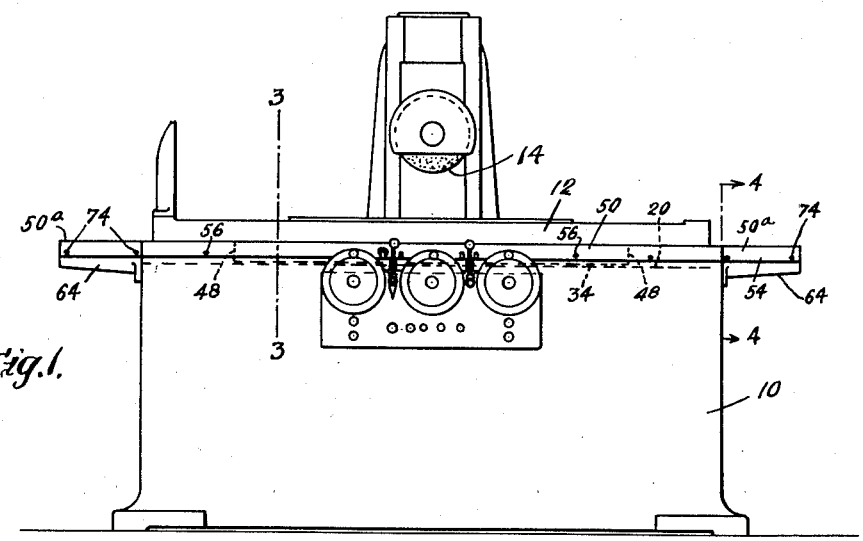
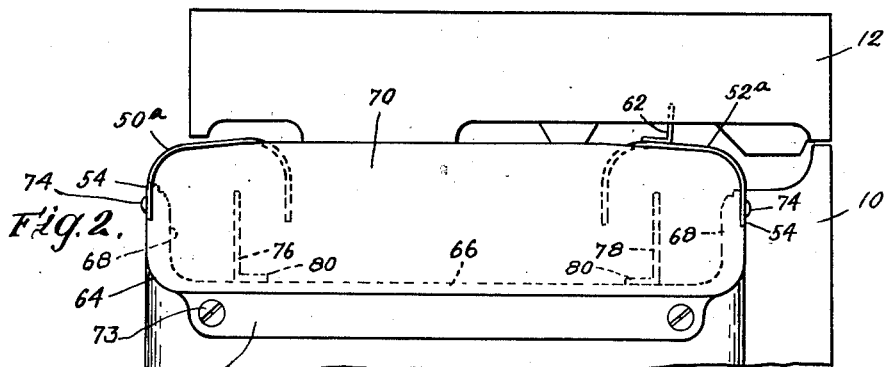
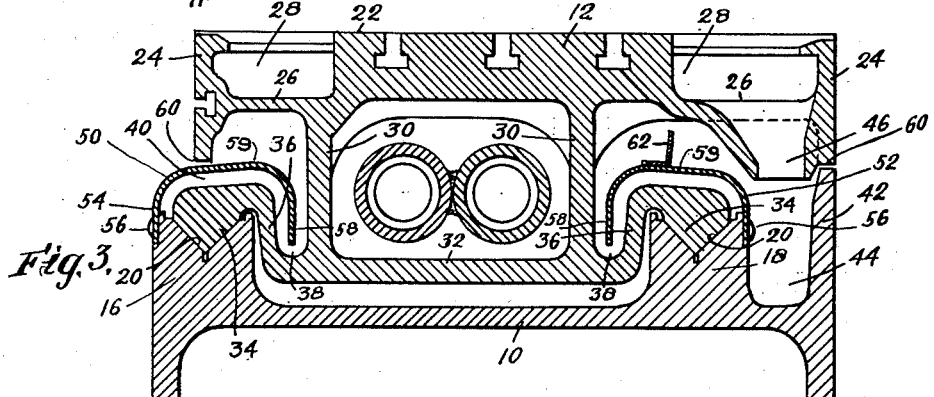
Inventor
Elton S. Cornell

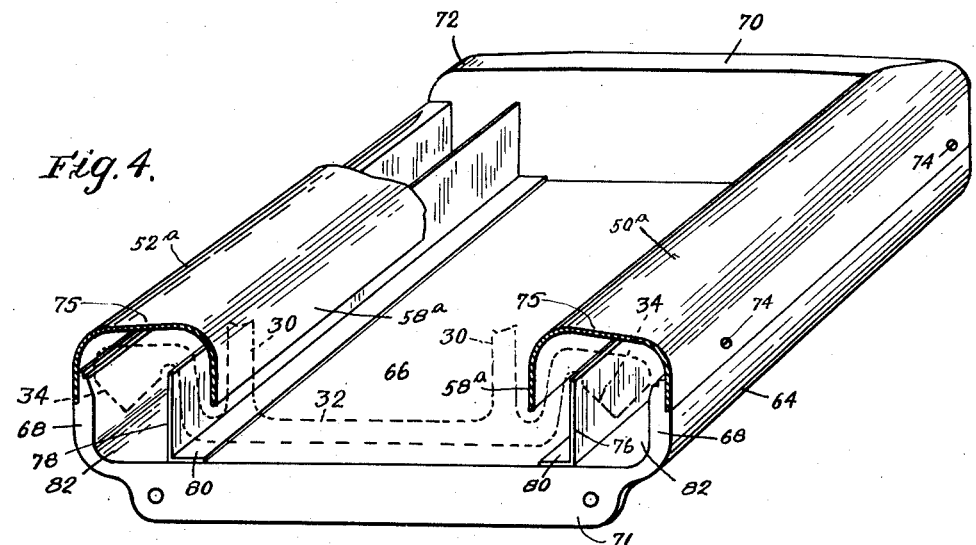
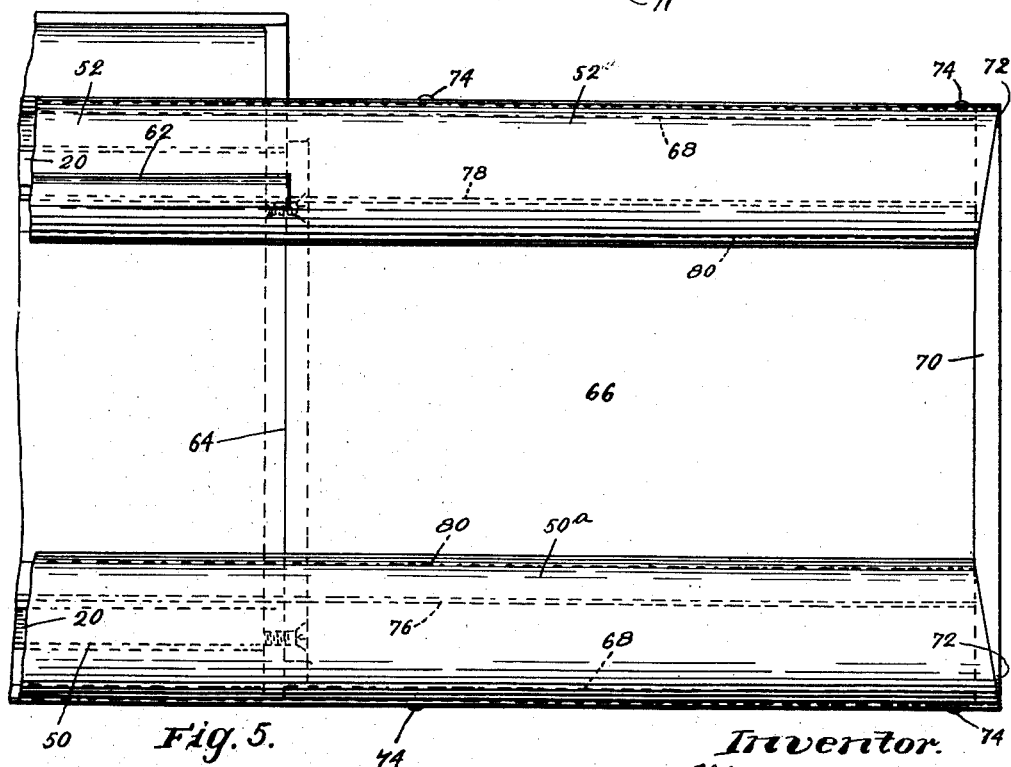

Patented Aug. 26, 1941

2,253,846

UNITED STATES PATENT OFFICE 2,253,846

MACHINE TOOL AND DUST GUARD THEREFOR

Elton S. Cornell, East Providence, R. I., assignor to Abrasive Machine Tool Company, East Providence, R. I., a corporation of Rhode Island Application February 23, 1939, Serial No. 257,952

9 Claims. (Cl. 308—3)

This invention relates to machine tools of the type wherein a carriage is movable on ways of a bed and has particular reference to grinding machines and to means for protecting the ways of the bed and carriage from the dust formed by a cutting wheel.

The bed of a grinder commonly is provided with V-shaped grooves in which correspondingly shaped ribs or runners of the carriage are movable to guide the carriage for reciprocatory movement in a straight line with respect to the cutting wheel. The grooves and ribs ordinarily are located under the carriage and are thereby somewhat shielded from the dust and chips formed by the cutting wheel that may fall from the sides of the table.

While the grooves and runners usually are located under the carriage and while it has been proposed to employ a guard plate of some suitable form interposed between the work-supporting face of the carriage and the ways and runners to prevent dust and chips from falling directly thereon, it is a fact nevertheless that dust does collect upon the oily surfaces of the ways and runners since the ends of the ways are open and the runners, during the end parts of the stroke of the carriage, project beyond the ends of the bed and the ways thereof. Thus the bearing surfaces are exposed to the surrounding atmosphere and collect therefrom the dust that inevitably is therein. Furthermore, grinding machines usually are arranged in end to end order in batteries with the ways of one machine more or less in line with the wheel of the next adjacent machine so that dust from the wheel of one machine can be thrown more or less directly onto the surfaces of the ways and runners of the adjacent machine.

While the need for adequate shielding of the ways and runners has been apparent for many years, no satisfactory arrangement has been suggested heretofore and recourse has been made to hardened steel ways, even for lightly loaded ways, to reduce the rapidity of wear due to dust, regardless of the high cost of such ways, which is approximately four hundred dollars for a small surface grinding machine.

Hence it is an object of the present invention to provide means for effectively enclosing the co-acting bearing surfaces of the bed and carriage of a machine tool, such as a surface grinding machine, so that dust is not readily accessible to any part of the co-acting surfaces at any time and particularly when the carriage overhangs the bed.

It is a further object of the invention to provide a housing projecting beyond the bed of the machine in line with the ways and into which the V's or runners of the carriage are adapted to pass at the end part of the stroke thereof, the housing being arranged to shield the parts of the carriage and the ways of the bed from ready access by dust.

Another object of the invention is the provision of means to enclose in an effective manner the ways of the machine on all sides, that is to say, the top, bottom, sides and ends, and in all positions of the table, while at the same time permitting free movement of the table.

An additional object of the invention is the provision of overlapping guard members, spaced to admit passage and free movement of a runner carrying member of the table, and so arranged as to exclude dust from the ways.

A further object is generally to improve the construction of grinding machines.

Fig. 1 is a front elevation of a surface grinding machine embodying the present invention.

Fig. 2 is an end view of that portion of the bed of the machine of Fig. 1 containing the invention.

Fig. 3 is a sectional detail taken along line 3—3 of Fig. 1.

Fig. 4 is a perspective detail, partly broken away, of an end housing of the machine of Fig. 1 taken along line 4—4 of Fig. 1.

Fig. 5 is a plan detail of the housing of Fig. 4 and a cooperating adjacent part of the machine bed.

The invention is herein applied to a surface grinding machine having the bed or frame 10 on which the work supporting table or carriage 12 is reciprocable under a cutting wheel 14. The bed 10 at the top part thereof under the carriage is provided with a pair of upstanding ledges 16 and 18 which extend lengthwise of the machine and have parallel V-shaped grooves 20 formed in their upper faces providing the ways of the bed on which the carriage 12 is reciprocated.

The carriage is provided with a work supporting table 22 and a peripheral rim or wall 24 which is spaced from the table and is connected to the table by a horizontal wall 26 located beneath the face of the table and providing a channel 28 in which liquid coolant collects when such coolant is used.

The carriage below the table is a box-like construction having the side walls 30 which are located between the ways of the bed and the horizontal bottom wall 32 which is located beneath the tops of the ways and which in some constructions can be omitted. The carriage is provided with V-shaped runners 34 which are located in and are slidable along the V-shaped grooves 20 of the bed. The runners or V's are connected to the body of the carriage by depending walls or webs 36 which are generally parallel with the walls 30 and between them and the ways of the bed and form with said walls channels 38 which are closed at the bottom and open at the top under the wall 26 and are parallel and substantially co-extensive with the lengths of the runners, the ends of the channel being open at the ends of the runners.

The front part of the peripheral rib or wall 24 of the table overlies and is spaced above the top of the front runner 34 as indicated at 40 while the rear part of the wall 24 is in vertical line with and terminates close to the top of an upstanding rib 42 of the bed. Said rib is spaced from the rear way 18 to provide a channel or trough 44 into which coolant from the channel 28 can flow from a nozzle 46 of the carriage.

The ways or V-grooves 20 of the bed ordinarily are co-extensive with the length of the bed. The runners 34 of the table ordinarily are shorter than the ways and when the carriage is in the mid position thereof, as illustrated in Fig. 1, the V's terminate at some position inset from the ends of the carriage, as illustrated at 48, Fig. 1.

In accordance with the present invention the means for protecting the ways and runners of the machine from access by dust includes shield members 50 and 52. Said shield members are similar in construction and each includes a sheet metal plate of inverted channel or U-shape which overlies and is spaced from the associated runner of the carriage and has an outer leg 54 fixed by suitable means as screws 56 to the associated way-rib of the bed and the inner leg 58 located in and spaced from the walls of the groove or channel 38. With this arrangement chips and dust cannot readily gain access to the ways of the bed. The top wall 59 is declined outwardly so that dust thereon tends to fall outwardly of the ways and runners. The bottom edge 60 of the front part of the peripheral wall 24 of the table is spaced close to the upper part of the inverted channel guard and in cooperation with the similar close spacing between the rear part of the wall and the upstanding rib 42 of the bed renders difficult the access of dust or chips to the channels 38 and to the inner parts of the ways.

The guard 52 is provided with an upstanding baffle or splash plate 62 which confronts the nozzle 46 and prevents coolant discharging into the trough 44 from the nozzle from splashing into the associated channel 38.

The bed at each end thereof is provided with a housing 64 which is arranged in the line of the ways and is adapted to form an enclosure for the associated end of the way and also a closed compartment for the associated runner of the carriage when the runner overlies the bed at either end thereof. The housings 64 are or can be identical. Each housing consists of a flat, generally horizontal, bottom wall 66, parallel upstanding side walls 68, and an upstanding end wall 70 which is located at the outer end of the housing remote from the bed of the machine and is integral with the walls 66 and 68 and upstands above said walls and is provided with rounded corners 72. Said housing is provided with a flange 71 which depends from the bottom wall flush therewith and with the ends of the side walls 68 through which attaching members or screws 73 are passed to secure the housing detachably to the end of the bed.

Said housing is provided with sheet metal inverted channel members 50a and 52a which can be integral with and extensions of the channel members 50 and 52 or separate members thereof abutted thereagainst. Each channel member is associated with a separate side wall 68 and is suitably secured thereto by screws 74 and has a top wall 75 which at the outer end thereof fits snugly on the top face and rounded corner 72 of the end wall by which the end of the channel is closed. Other guard members comprising upstanding plates 76 and 78 having horizontal legs 80 resting upon and secured to the inner face of the bottom walls 66 cooperate each with an inverted channel member and are located within the channel member and upstand thereinto above the ends of the inner leg 52a of the associated inverted channel and abut against the end wall 70 at one end and against the end of the associated way-rib 16, 18 and approximately in line with the inner face thereof, the plates being approximately the height of the rib. The upstanding plates 76 cooperate with the side walls 68 of the housing to form channels or compartments 82 therein which are in line with and continuations of the ways of the bed and form end closures for the ways and receive and enclose the end parts of the runners of the carriage as indicated in the dotted lines Fig. 4 when the carriage is in the end part of its stroke and the runners overlie the end of the bed.

By the provision of the described housings the V's are substantially protected against direct access by dust and hence a longer useful life of the runners and ways is assured.

I claim:

1. In a machine tool, a bed having ways, a reciprocable carriage having runners movable on said ways, and a protective housing fixed to the outer side wall portions of said beds and having stationary members each provided with a top part overlying an associated runner and a pair of depending side parts respectively in front of and behind the runner, said members enclosing said movable runners and providing a dry seal therefor in all positions of said carriage on said bed.

2. In a machine tool, a bed having a pair of parallel ways, a reciprocable carriage having runners movable on said ways, said ways being open at the ends thereof, and a housing fixed to the end of the bed having runner-receiving compartments confronting the ends of said ways and having stationary structural members surrounding the projected movable runners and constituting dust sealing end closures therefor.

3. In a machine tool, a bed having ways, a movable carriage having runners movable along said ways, and a runner enclosing housing at the ends of said ways having a bottom wall and spaced side walls abutting endwise against said ways and providing runner receiving channels extended lengthwise of said ways, and top cover walls for said channels, said cover walls being spaced from certain of said side walls.

4. In a machine tool, a bed having ways, a movable carriage having runners reciprocable on said ways, a housing at the ends of said ways having bottom walls and spaced side walls abutted against the ends of said ways and providing runner receiving compartments extended in the line of said ways, and cover plates overlying said compartments and also overlying said ways.

5. In a machine tool, a bed having ways, a carriage having runners movable on said ways, a housing at the end of a way having a runner receiving compartment projected in the line of said way, and a cover plate overlying said compartment and said way.

6. In a machine tool, a bed having ways, a carriage having a body part, outstanding runners and a channel between said runners and body part, and a housing fixed to said bed enclosing the ends of said ways having means providing a pair of spaced parallel closed-top runner receiving compartments closed at the end remote from the bed and disposed in the line of said ways and also having an interposed open-top body receiving space.

7. In a machine tool, a bed having ways, a carriage having runners movable on said ways, and a housing enclosing the ends of said ways fixed to and extended from the end of the bed having pairs of upstanding spaced side walls forming runner receiving passages therebetween and having an end wall remote from the bed for closing the passages, and cover plates overlying said passages and spaced from said side walls, said cover plates having depending sides which overlie and are spaced from certain of said side walls.

8. In a machine tool, a bed having ways, a carriage having a body part, outstanding runners and webs connecting said runners and body part, and a housing enclosing the ends of said ways fixed to and extended from the end of the bed and comprising a bottom wall, a set of upstanding spaced side walls providing runner receiving passages between them, and an end wall connecting said bottom wall and said side walls to close the end of said housing remote from said bed, and inverted U-shaped cover plates overlying said passages and having depending legs which project below and are spaced from certain of said upstanding walls and provide web receiving passages between them.

9. In a machine tool, a bed having ways, a carriage having a body part, outstanding runners and webs connecting said runners and body part, and housings at the ends of said ways comprising a bottom wall, a set of upstanding spaced side walls providing runner receiving passages between them, and an end wall which closes the ends of the passages remote from the bed and inverted U-shaped cover plates overlying said passages and having depending legs which project below and are spaced from certain of said upstanding walls and provide web receiving passages between them, said cover plates having parts which also overlie said ways of said bed.

ELTON S. CORNELL.

CERTIFICATE OF CORRECTION.

Patent No. 2,253,846.                                              August 26, 1941.

ELTON S. CORNELL.

It is hereby certified that error appears in the printed specification of the above numbered patent requiring correction as follows: Page 3, second column, line 19, claim 9, for the word "housings" read --a housing--; and that the said Letters Patent should be read with this correction therein that the same may conform to the record of the case in the Patent Office.

Signed and sealed this 18th day of November, A. D. 1941.

(Seal)
                                                Henry Van Arsdale,
                                          Acting Commissioner of Patents.